Jan. 13, 1931.　　C. C. TOMKINSON　　1,788,814

TOGGLE BOLT

Original Filed Aug. 22, 1928　　2 Sheets-Sheet 1

INVENTOR
Charles C. Tomkinson
BY
Marshall & Hawley.
ATTORNEYS

Jan. 13, 1931. C. C. TOMKINSON 1,788,814
TOGGLE BOLT
Original Filed Aug. 22, 1928 2 Sheets-Sheet 2
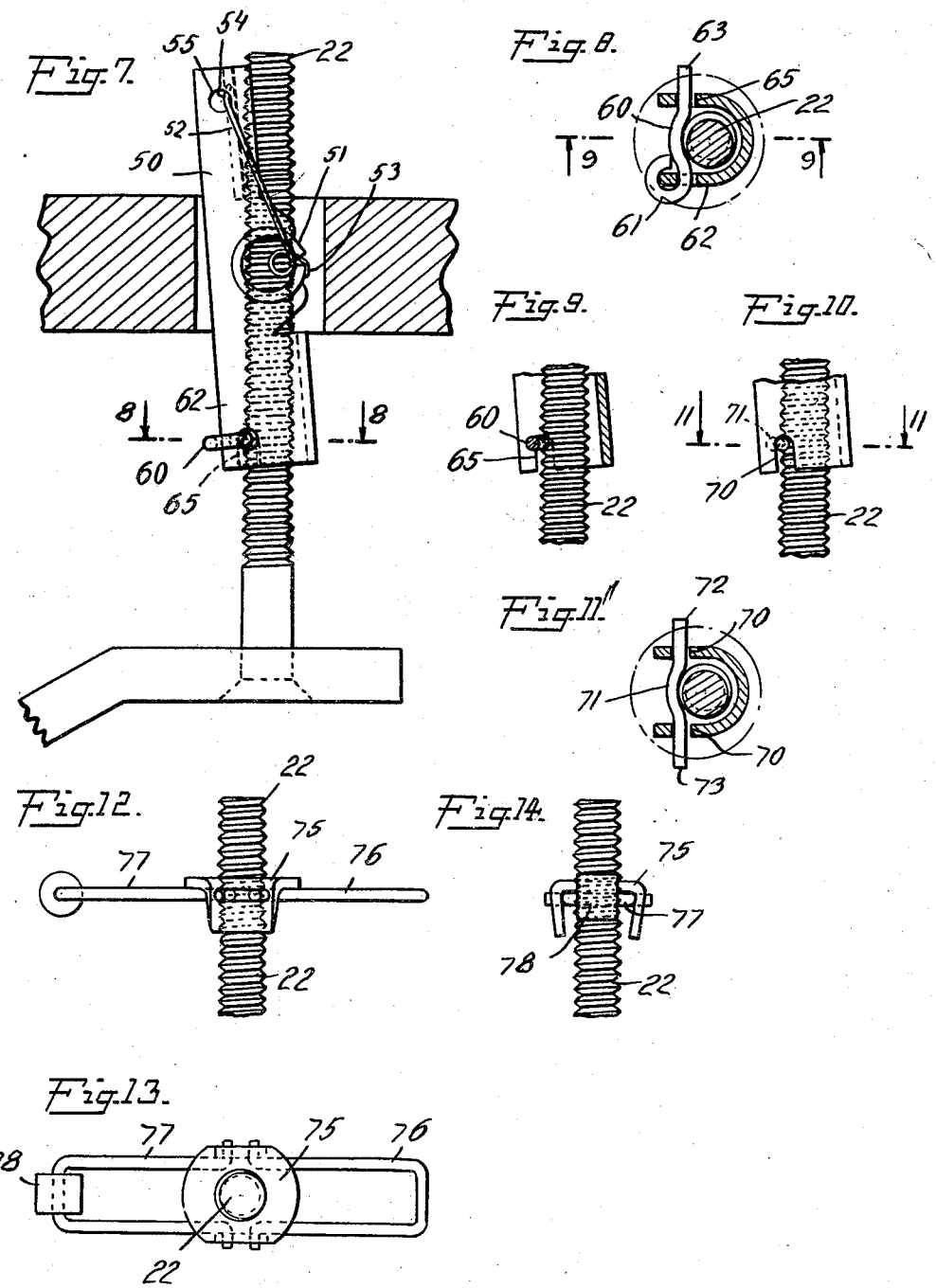

Patented Jan. 13, 1931

1,788,814

UNITED STATES PATENT OFFICE

CHARLES C. TOMKINSON, OF PLAINFIELD, NEW JERSEY, ASSIGNOR, BY MESNE ASSIGNMENTS, TO J. EDWARD OGDEN COMPANY, OF NEW YORK, N. Y., A CORPORATION OF NEW JERSEY

TOGGLE BOLT

Application filed August 22, 1928, Serial No. 301,208. Renewed December 2, 1930.

This invention relates to toggle bolts.

One type of toggle bolt consists of a saddle or nut threaded on the bolt and having a wing or wings pivoted thereon. In the spring toggle type, the wing or wings are spring pressed outwardly to operative position.

In order to thread the bolt into the nut or saddle, it is necessary to pull the bolt outwardly until the wing or wings engage the inside of the wall and to turn the bolt when thus held. This is a slow and an awkward procedure, particularly when a number of toggle bolts are used in the same bracket.

Furthermore, the placing of the usual toggle bolt in a hole necessitates the retracting and holding of the wing or wings in a position substantially parallel to the bolt. This requires considerable pressure, especially where heavy springs are used.

This invention has for one of its objects to provide means for holding toggle bolt wings or a toggle bolt wing in folded position or in a position substantially parallel to the bolt while the device is being inserted in an opening.

Another object of the invention is to provide a wing holding device for toggle bolts so constructed and arranged that the wing or wings held thereby will be automatically released after they are positioned in the hole.

Another object of the invention is to provide means on a toggle bolt for holding the wing or wings and nut from turning on the bolt as the bolt is threaded into the nut or saddle.

Further objects of the invention will appear from the following specification taken in connection with the drawings, which form a part of this application, and in which Fig. 1 is a sectional elevation showing a spring toggle bolt with wing holding means constructed in accordance with the invention, the bolt being shown as partially inserted through a hole in a wall;

Fig. 7 is an elevational view illustrating another form of toggle bolt having wing holding means constructed in accordance with the invention;

Fig. 8 is a section elevation taken substantially on line 8—8 of Fig. 7;

Fig. 9 is a sectional elevation taken substantially on line 9—9 of Fig. 8;

Fig. 10 is a view similar to Fig. 9 but illustrating a slightly modified construction;

Fig. 11 is a sectional elevation taken substantially on line 11—11 of Fig. 10;

Fig. 12 is an elevational view illustrating a toggle bolt having a slightly different form of means thereon for preventing the wings from turning as the bolt is threaded into the saddle;

Fig. 13 is a top plan view taken substantially at right angles to Fig. 12; and

Fig. 14 is an elevational view taken at right angles to Fig. 12.

Figure 1:
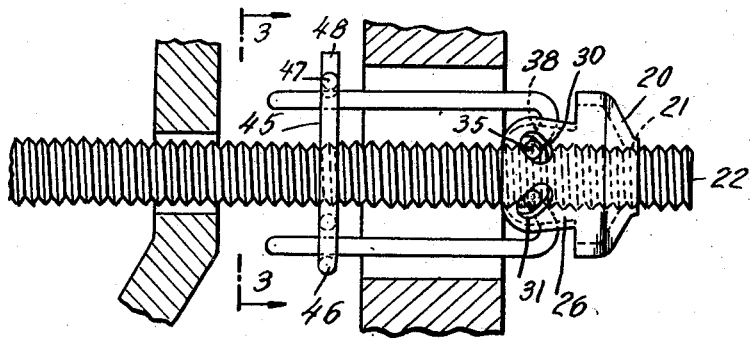
Figure 2:
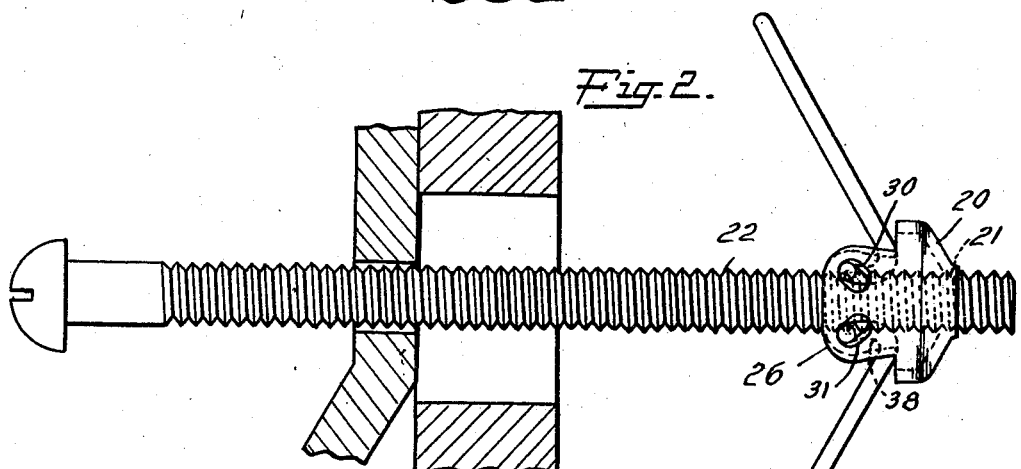
Fig. 2 is a view similar to Fig. 1 but showing the nut and wings positioned inside the wall opening.
Figure 3:
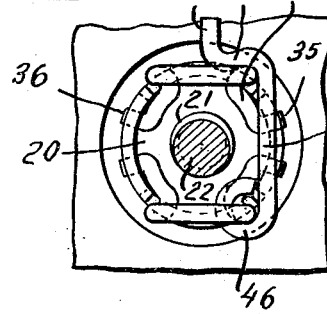
Fig. 3 is a sectional elevation taken substantially on line 3—3 of Fig. 1.
Figure 4:
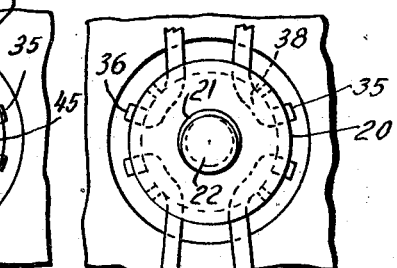
Fig. 4 is an end elevation of the expanded toggle shown in Fig. 2, the upper wing being partially broken away.

The invention briefly described consists of a spring actuated toggle bolt having means for holding the wing or wings thereof in retracted position or in a position substantially parallel to the bolt when the toggle is being inserted in an opening. The holding means is so constructed and arranged that after the wing or wings are positioned in the opening, the holding means will be automatically released by engagement with the outer surface of the wall. After the bolt has been moved through the opening a sufficient distance to free the wing or wings, the holding means will act as a weight to hold the wing or wings in upright position, thus preventing the nut or saddle from turning as the bolt is threaded therethrough.

Further details of the invention will appear from the following description.

In the form of the invention illustrated in Figs. 1 to 6 inclusive, there is shown a nut or saddle 20 having a threaded opening 21, through which is threaded a bolt 22. The saddle is provided with a pair of lugs 25 and 26 having edges 28 and 29.

Figure 5:
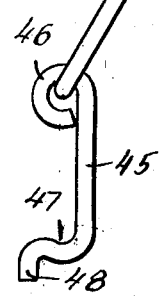
Fig. 5 is an elevational view taken at right angles to Fig. 1.
Figure 5:
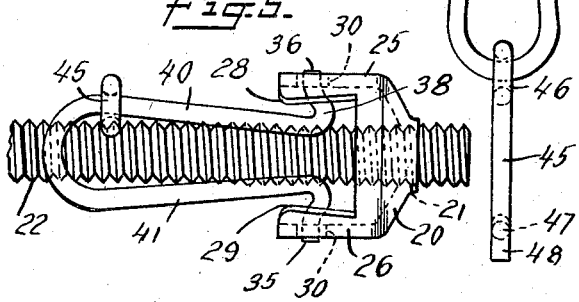
Figure 6:
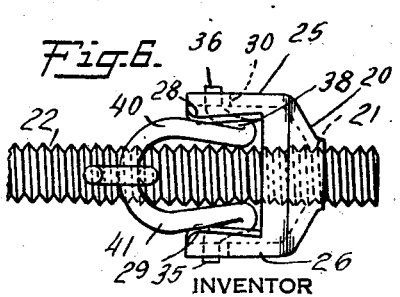
Fig. 6 is a view taken at right angles to Figs. 2 and 4.

Each lug has formed therein a pair of openings 30 and 31 and a pair of wings are mounted between the lugs, each wing being formed of resilient material, preferably wire, and having outturned lugs 35 and 36 which are pivotally mounted in the openings 30 or 31 of the lugs 25 and 26. From the showing in Fig. 1, it will be seen that the end portions of the wings are bent at an angle, as shown at 38, forming cams, between the U-shaped portion of the wing and the outturned ends 35 and 36. Due to the engagement of the angular portions 38 of the wings with the inner surfaces of the lugs 25 and 26, the pivoted ends of the wings will move toward each other as the wings are folded and the legs 40 and 41 of the wings will be constricted, as shown in Fig. 5. When the wings are released they will automatically spring outwardly or spread to the position shown in Fig. 2.

In order to facilitate the insertion of the toggle bolt through a hole, means is provided for holding the wings in retracted position. In the form of the invention illustrated in Figs. 1 to 6 inclusive, this means consists of a latching device 45 having an eye 46 at one end loosely pivoted on one of the wings. The latch also has a hook 47 at the other end thereof and a tab 48 extending beyond the hook.

When the device is to be inserted in a hole, the latch is positioned as shown in Fig. 1, and holds the wings in substantially parallel position. As the device is inserted through the hole, the latch will engage the outer surface of the wall and will be moved along the wings until the end thereof having the hook is released from engagement with the wing. The wings will then spring outwardly but will be held against movement to their spread or expanded position by the wall of the opening until the ends of the wing clear the opening. The wings will then be automatically spread to the position shown in Fig. 2 and since the latch increases the weight of the wing attached thereto, the device will take the position illustrated in Fig. 2 and will be held in this position by the weight of the latch as the bolt is threaded through the saddle or nut.

In the form of the invention illustrated in Figs. 7 to 11 inclusive, there is shown a toggle bolt having a single wing. The wing 50 in this case is channel shaped and is pivotally mounted on a tubular nut 51 which is threaded on the bolt 22. A spring 52 is disposed within the tubular nut and has one end 53 engaging the nut and the other end 54 positioned through an opening 55 in the wing 50. The spring tends to swing the wing to a position substantially at right angles to the bolt. This form of toggle bolt is fully described and claimed in copending application Serial No. 38,194, filed June 19, 1925.

In order to hold the wing 50 in a position substantially parallel to the bolt, as shown in Fig. 7, a latch 60 is pivoted at 61 to one side 62 of the channelled wing. The other end 63 of the latch is inserted in an elongated notch 65 formed in the other side of the channelled wing. When the latch is so positioned as shown in Figs. 7 and 8, the bolt 22 will be retained between the two sides of the wing. The device is then inserted through the hole in the manner shown in Fig. 7 and when the outer surface of the wall is engaged by the end 63 of the latch, the latch will be released from the notch 65 and will permit the spring 52 to swing the wing. After the wing has passed through the opening, the weight of the latch will tend to hold the wing from turning as the bolt is threaded through the nut 51.

In the form of the invention illustrated in Figs. 10 and 11, the construction is similar to that illustrated in Figs. 7 and 8, but differs therefrom in that both sides of the wings are provided with notches 70 extending longitudinally therein from the end thereof. A latching pin 71 is inserted in the notches 70, as shown in Fig. 11, and the two ends 72 and 73 of the pin extend laterally from the wing and are adapted to engage the outer surface of the wall as the wing is inserted in the wall opening.

In Figs. 12, 13 and 14, there is shown a toggle bolt comprising a saddle 75 which is threaded on the bolt and has pivotally mounted thereon a pair of wings 76 and 77. One of the wings has a weight 78 on its outer end and the weight will hold the wing in upright position after it has been passed through a wall opening, thus preventing the saddle and wings from turning as the bolt is threaded through a saddle.

From the foregoing specification it will be clear that simple and practical means has been provided for holding the wing or wings of a toggle bolt in retracted position during the insertion of the device through a wall opening and that the latching means will operate to hold the nut or saddle and wings from turning as the bolt is threaded through the nut or saddle.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. A toggle bolt structure comprising a bolt, a spring actuated wing pivotally associated with the bolt and adapted to swing from a position substantially parallel thereto to a position transverse thereto, said wing being adjustable longitudinally on the bolt to a plurality of operative positions, and means for holding the wing under tension in a position substantially parallel to the bolt, said means being releasable as the toggle bolt structure is used.

2. A toggle bolt structure comprising a bolt, a spring actuated wing pivotally associated with the bolt and adapted to swing from a position substantially parallel thereto to a position transverse thereto, said wing being adjustable longitudinally on the bolt to a plurality of operative positions, and pivoted means carried by the wing for holding the wing under tension in a position substantially parallel to the bolt, said means being releasable as the toggle bolt structure is used.

3. A toggle bolt structure comprising a bolt, a spring actuated wing pivotally associated with the bolt and adapted to swing from a position substantially parallel thereto to a position transverse thereto, said wing being adjustable longitudinally on the bolt to a plurality of operative positions, and pivoted means for holding the wing under tension in a position substantially parallel to the bolt, said means being releasable as the toggle bolt structure is used.

4. A toggle bolt structure comprising a bolt, a spring actuated wing pivotally associated with the bolt and adapted to swing from a position substantially parallel thereto to a position transverse thereto, said wing being adjustable longitudinally on the bolt to a plurality of operative positions, and means for holding the wing under tension in a position substantially parallel to the bolt, said means being movable in a direction substantially parallel to the axis of the bolt to release the wing, by normal operation of the toggle bolt structure.

5. A toggle bolt structure comprising a bolt, a pair of wings pivotally associated therewith and resiliently actuated to swing laterally away from the bolt said wings being adjustable longitudinally on the bolt to a plurality of operative positions, and means for holding said wings in folded position, said means being releasable as the toggle bolt structure is used.

6. A toggle bolt structure comprising a bolt, a pair of wings pivotally associated therewith and resiliently actuated to swing laterally away from the bolt, and means pivotally carried by one wing and engageable with the other wing for holding said wings in folded position, said means being releasable as the toggle bolt structure is used.

7. A toggle bolt structure comprising a bolt, a pair of wings pivotally associated therewith and resiliently actuated to swing laterally away from the bolt, and means carried by one wing and releasably engageable with the other wing for holding said wings in folded position, said means being releasable during normal operation of the toggle bolt structure.

8. A toggle bolt structure comprising a bolt, a pair of wings pivotally associated therewith and resiliently actuated to swing laterally away from the bolt, and means pivotally carried by one wing and releasably engageable with the other wing for holding said wings in folded position, said means being releasable during normal operation of the toggle bolt structure.

9. A toggle bolt structure comprising a bolt, a pair of wings pivotally associated therewith and resiliently actuated to swing laterally away from the bolt, and means carried by one wing and engageable with the other wing for holding said wings in folded position, said wing holding means being movable in a direction substantially parallel to the axis of the bolt to release said wings said means being releasable during normal operation of the toggle bolt structure.

10. A toggle bolt structure comprising a bolt, a nut threaded thereon, a pair of wings independently pivoted on said nut, and means carried by one of said wings, so dimensioned that said wing will be heavier than the other wing.

11. A toggle bolt structure comprising a bolt, threaded means mounted on said bolt, a wing pivotally mounted on said threaded means resiliently actuated to swing away from the bolt and releasable means to hold said wing in folded position against the bolt, said releasable means acting after release to prevent the threaded means from rotating when the bolt is rotated.

12. A toggle bolt structure comprising a bolt, a pair of wings pivotally associated therewith and resiliently actuated to swing laterally away from the bolt, and means pivotally and slidably mounted on one wing and adapted to engage the other wing and hold the wings against relative spreading movement.

13. A toggle bolt head, a pair of wings carried thereby and resiliently actuated to swing laterally relative to each other, and means releasable during normal operation of the bolt head and slidable on said wings for holding the wings in folded position, said wings being freely movable to open position when released from said holding means.

14. A toggle bolt head, a pair of wings carried thereby and resiliently actuated to swing laterally relative to each other, and releasable during normal operation of the bolt head and slidable on said wings lengthwise of the wings for holding the wings in folded position, said wings being freely movable to open position when released from said holding means.

15. A toggle bolt head comprising a saddle member, a pair of U-shaped, resiliently actuated wings pivoted at their open ends to said saddle member, and means pivoted to one of said U-shaped wings and engageable with the other wing to hold the wings in folded position, said means being releasable as the bolt head is used.

16. A toggle bolt head comprising a saddle member, a pair of U-shaped, resiliently actuated wings pivoted at their open ends to said saddle member, and means pivoted to one of said U-shaped wings and engagable with the other wing to hold the wings in folded position, said means being releasable as the bolt head is used.

17. A toggle bolt head comprising a saddle member, a pair of U-shaped, resiliently actuated wings pivoted at their open ends to said saddle member, and means slidably carried by one of said U-shaped wings and engageable with the other wing to hold the wings in folded position, said means being releasable as the bolt head is used.

18. A toggle bolt head comprising a saddle member, a pair of U-shaped, resiliently actuated wings pivoted at their open ends to said saddle member, and means pivoted to and slidable on one of said U-shaped wings and engageable with the other wing to hold the wings in folded position.

19. A toggle bolt structure comprising a bolt, a pair of wings pivotally associated with said bolt and resiliently actuated to swing to open position, and a releasable latch engaging said wings to hold the wings in folded position, said latch projecting laterally beyond one of the wings when the wings are folded and latched.

20. In a toggle bolt structure, a pair of pivoted, resiliently actuated wings movable from folded to open position, one of the wings having a latch mounted thereon and movable longitudinally of the wing and engageable with the other wing to hold the wings in folded position.

21. A toggle bolt structure comprising a bolt, a spring actuated wing pivotally associated with the bolt and adapted to swing from a position substantially parallel thereto to a position transverse thereto, and releasable means for holding the wing under tension in the position substantially parallel to the bolt, said holding means having a projecting portion extending laterally beyond the wing when the wing is parallel to the bolt and being engageable with the wall, when the wing has been projected into a wall opening, to release the holding means and permit the wing to move on its pivot to its position transverse to the bolt.

22. A toggle bolt structure comprising a bolt, a spring actuated wing pivotally associated with the bolt and adapted to swing from a position substantially parallel thereto to a position transverse thereto, and releasable means pivoted to the wing for holding the wing under tension in the position substantially parallel to the bolt, said holding means having a projecting portion extending laterally beyond the wing when the wing is parallel to the bolt and being engageable with the wall, when the wing has been projected into a wall opening, to release the holding means and permit the wing to move on its pivot to its position transverse to the bolt.

23. A toggle bolt structure comprising a bolt, a spring actuated wing pivotally associated with the bolt and adapted to swing from a position substantially parallel thereto to a position transverse thereto, and releasable means carried by the wing for holding the wing under tension in the position substantially parallel to the bolt, said holding means having a projecting portion extending laterally beyond the wing when the wing is parallel to the bolt and being engageable with the wall, when the wing has been projected into a wall opening, to release the holding means and permit the wing to move on its pivot to its position transverse to the bolt.

In witness whereof, I have hereunto set my hand this 30th day of July, 1928.

CHARLES C. TOMKINSON.